United States Patent
Lai et al.

(10) Patent No.: US 6,804,534 B2
(45) Date of Patent: Oct. 12, 2004

(54) METHOD AND DEVICE OF COMMUNICATION THROUGH WEB PAGE

(75) Inventors: Cheng-Shing Lai, Taipei (TW); Guo-Qing Tang, Nanching (CN)

(73) Assignee: Inventec Appliances, Corp., Taipei (TW)

( * ) Notice: Subject to any disclaimer, the term of this patent is extended or adjusted under 35 U.S.C. 154(b) by 735 days.

(21) Appl. No.: 09/758,153

(22) Filed: Jan. 12, 2001

(65) Prior Publication Data

US 2002/0094844 A1 Jul. 18, 2002

(51) Int. Cl.$^7$ ............................................. H04M 1/00
(52) U.S. Cl. ................ 455/556; 455/556.1; 455/556.2; 455/557; 455/412.2; 455/414.1; 455/414.2; 455/414.4; 455/415; 455/1; 379/201.01; 379/211.01; 709/225; 709/217; 709/203; 709/228; 705/14; 705/27; 370/522
(58) Field of Search ............................ 455/556, 412.2, 455/414.1, 414.2, 414.4, 415, 557; 379/201.01, 211.01; 709/225, 217, 203, 228; 370/522; 705/14, 27

(56) References Cited

U.S. PATENT DOCUMENTS

| | | | | |
|---|---|---|---|---|
| 6,112,242 A | * | 8/2000 | Jois et al. | 709/225 |
| 6,125,126 A | * | 9/2000 | Hallenst.ang.l | 370/522 |
| 6,658,100 B1 | * | 12/2003 | Lund | 379/201.01 |
| 2002/0085701 A1 | * | 7/2002 | Parsons et al. | 379/211.01 |

\* cited by examiner

Primary Examiner—Jean Gelin
Assistant Examiner—David Nguyen
(74) Attorney, Agent, or Firm—Birch, Stewart, Kolasch & Birch, LLP

(57) ABSTRACT

The present invention relates to a method of communication through web page and the device for the same. A cellular phone with a built-in modem is provided and there is a personal web page stored in the memory of the cellular phone. When a client end dials the telephone number of the cellular phone, the present invention automatically passes the personal web page to the client end if the modem is set on a responsive status, so that the other side is able to understand about the schedule and situation of the phone's owner. If the phone's owner also gets online in the meantime, he/she can further chats or leaves a message to the client end with each other through the personal web page. Thus it can be known that the present invention is able to flexibly fit the communicative requirements of the phone's owner in different periods. It is so convenient that even deaf-mute people also use it normally.

16 Claims, 4 Drawing Sheets

METHOD AND DEVICE OF COMMUNICATION THROUGH WEB PAGE

BACKGROUND OF THE INVENTION

1. Field of Invention

The present invention pertains to a method of communication and the device for the same. More specifically, the invention relates to a method through web page to let a phone's owner and a caller communicate with each other and the device for the same.

2. Related Art

The usage of a cellular phone is an important part of modern people life. No matter a salesman, a businessperson, a student or just one of the public, most of them rely on it to be a tool to communicate with one another in daily life. Now cellular phones spread widely because the interactions between people tend towards frequent and complicated in such an informative society. Specially living in a highly modernized society, a phone's owner still needs to keep in touch with others or receive outside information whenever and wherever, and more particular a phone's owner needs to make a two-way communication in real time.

From cellular phones coming out to now, their models and functions both change with each passing day. In addition to some important functions such like call displaying and call shocking, a lot of cellular phones further announce that they have WAP (Wireless Application Protocol) function. A cellular phone with WAP function is able to let its owner browses the Internet and receiving-sending e-mails so as to provide an advanced method to catch information. Even though it is, the functions of cellular phones are still a little bit insufficient. For example:

1. If a phone's owner is in an important meeting, coping with an significant matter or staying in a private time, doing something personal like marrying or travelling abroad, he/she doesn't want to be disturbed but is not willing to close his/her cellular phone to omit any important phone call as well. What is it going to do?
2. Sometimes because of work requirements or personal factors, the phone's owner needs to pass on his/her news to callers, like being in a meeting or on a vacation, but he/she is not able to notify everybody one by one just for a short while. Under above a situation, how is it to do of letting callers know what is going on?
3. The format and length of the text messages, which the cellular phones are able to transmit, have large restriction. Under above a situation, how is it to do of letting callers leave a message as detailed as possible?

SUMMARY OF THE INVENTION

In view of the foregoing, it is an object of the invention to solve the insufficient part of the cellular phones, so as to suit the different requirements of the phone's owner and let he/she and callers are able to pass messages with each other more conveniently and flexibly.

According to the above object, the present invention provides a method of communication through web page and the device for the same. In addition to the necessary components of a general cellular phone, the device of the present invention further needs a built-in modem, software supporting TCP/IP and HTTP protocols and a memory storing a personal web page. It provides two new ways of communication to the phone's owner. The first one is setting the modem on a responsive status when the phone's owner is not able to answer any phone call. After the client end's dialing, the present invention automatically passes the personal web page to the other side to understand the schedule and situation of the phone's owner. The other one is used when the client end and the phone's owner are both going online. After the client end's inputting the telephone number of the cellular phone, a special translative tool in ISP (Internet Service Provider) translates the telephone number into an IP address of the personal web page so that the client end is able to access the web page and leave messages or chat with phone's owner. Thus it can be known that the present invention is not only flexibly fitting the requirements of the phone's owner in different period but also convenient that even deaf-mute people is able to use it normally.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

The cellular phone under the present invention's structure has the function of a web page's provider. In other words, the cellular phone contains a personal web page 1, which disposition is shown as FIG. 1. The personal web page 1 is a kind of communicative bridge between the phone's owner and callers. So even the phone's owner is not able to answer any phone call, the callers still understand every important matter and schedule of the phone's owner from the personal web page. Moreover, the callers are able to leave messages or chat with the phone's owner through the personal web page.

Figure 1:
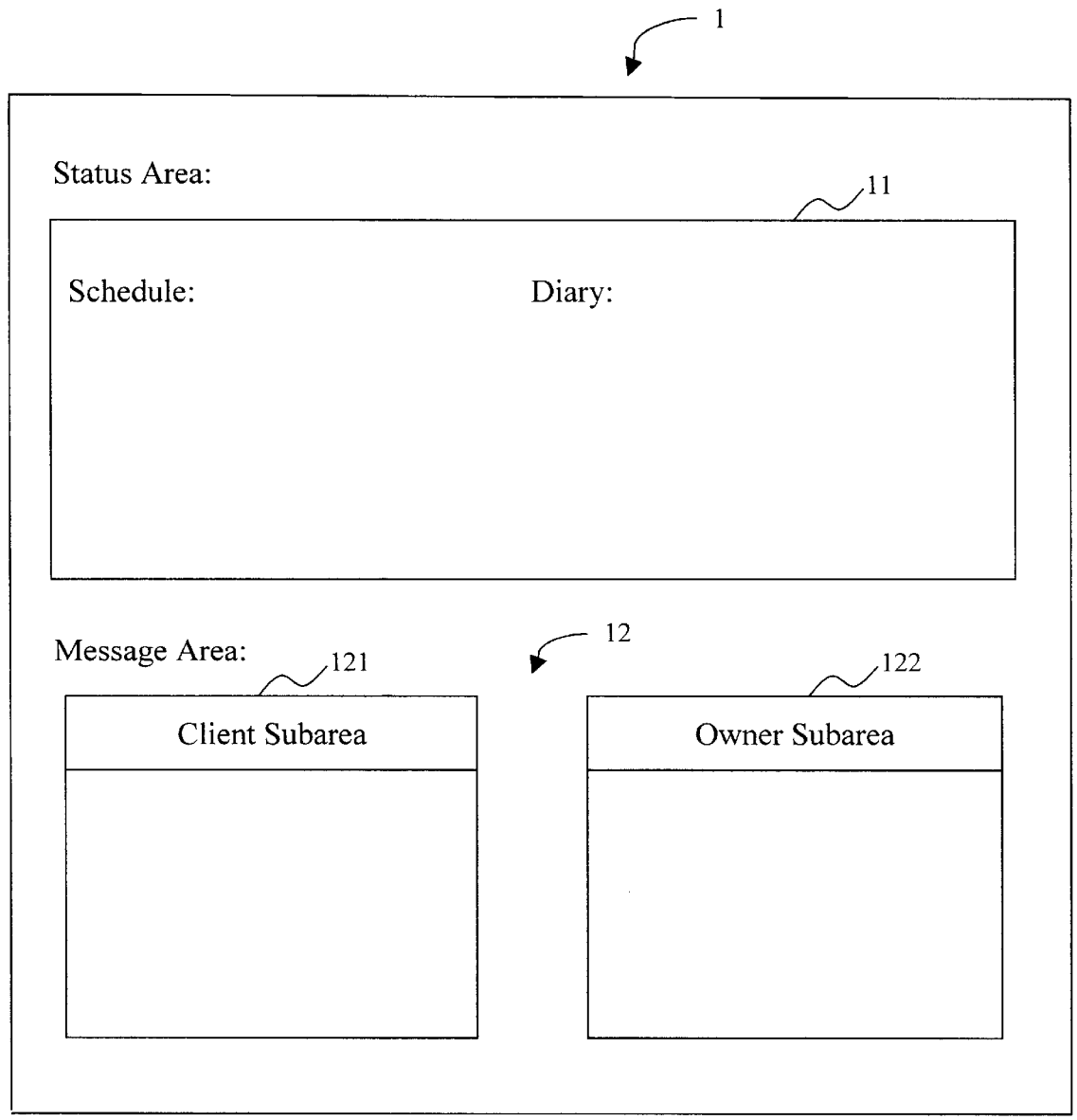
FIG. 1 is a schematic view showing the disposition of the web page of the present invention's method.

There are a variety of types of the disposition of the personal web page 1. As shown in FIG. 1, the personal web page 1 is divided into two main areas named Status Area 11 and Message Area 12. Status Area 11 shows the schedule, the important events and the diary (or the records) of the phone's owner. It lets callers realize the situation of the phone's owner, for instance: maybe the phone's owner is in meeting, in a business trip or travel abroad for a vocation, through the content of Status Area 11 when the callers make a phone call to the phone's owner. Message Area 12 is further divided into two subareas named Client Subarea 121 and Owner Subarea 122. The phone's owner is capable of leaving news behind in the Owner Subarea 122 and callers are capable of leaving messages in the Client Subarea 121 as well after their accessing the personal web page 1. If the phone's owner is also browsing the personal web page 1 in the meantime, both side of them are capable of chatting with each other in the Message Area 12. Because the way of "conversation" is soundless, nobody will be bothered in the surroundings of the cellular phone. It is convenient that even deaf-mute people also use it normally. Moreover, because the data format of the cellular phone capable of transmitting is restricted and it is considered of the time of transmission, the personal web page 1 shows text primarily. The disposition of the personal web page 1 described above is just an example. The type of the disposition of the personal web page 1 is not going to be restricted by the example.

Figure 2:
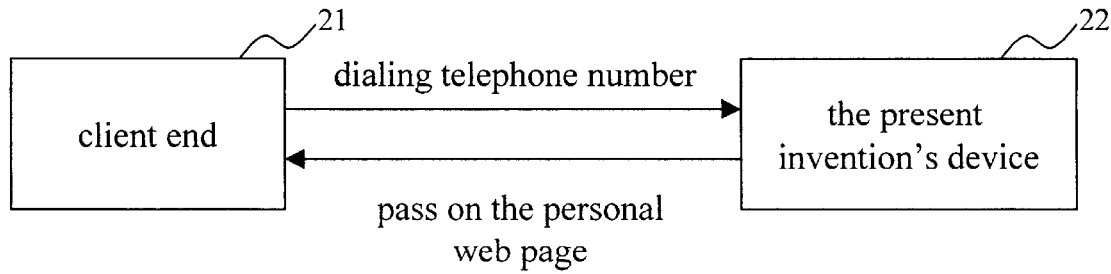
FIG. 2 is a schematic view showing the first embodiment's working of the present invention's method.

The method of the present invention has two embodiments. The first one is shown as FIG. 2. When a client end 21 has an input of the telephone number of the present invention's device 22 on its browser and dials the number, it transmits a communicating signal to the present invention's device 22. Then the present invention's device 22 checks whether its built-in modem is set on a responsive status or not. If it is, the personal web page 1 will be automatically passed to the other side. If it is not, a normal procedure of phone's ringing or shocking will be caused.

The practice basing on the first embodiment is easier, more direct and faster, and its operation is more convenient, too. Nevertheless, due to its transmission in communicating process is through a telephone system. Users need to pay the expense of telephone. If it is a long-distance call, the expense will be higher.

Figure 3:
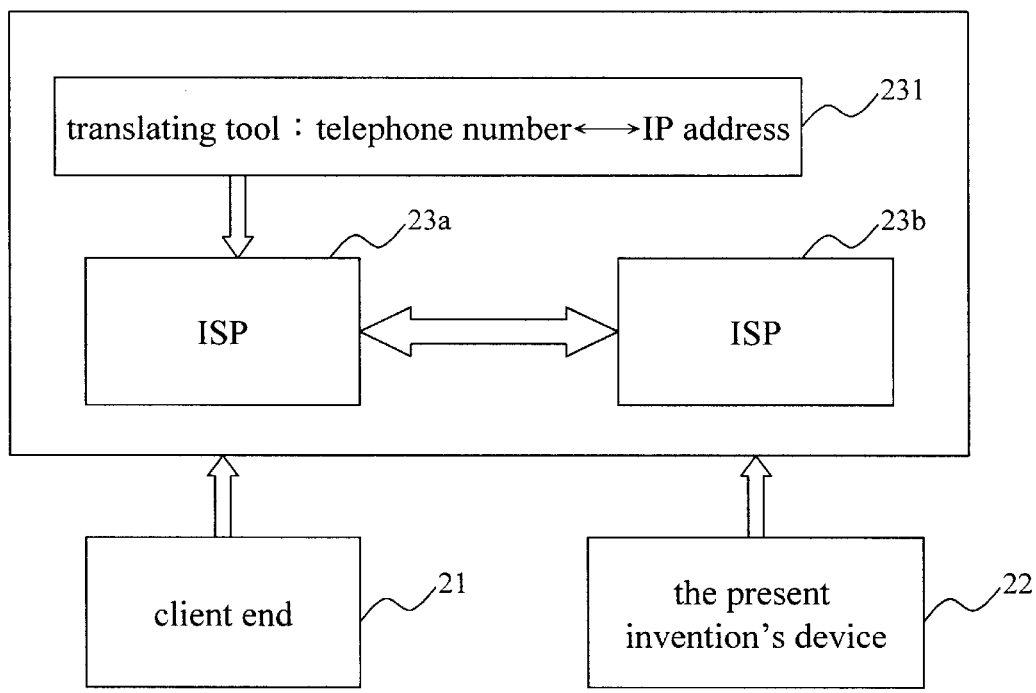
FIG. 3 is a schematic view showing the second embodiment's working of the present invention's method.

So the method of the present invention further brings up a second embodiment, which work's content is shown as FIG. 3. This is a kind of method that can save expense, but the ISP (Internet Service Provider) 23a of the client end 21 must support a special translating tool 231, which contains a relationship between a IP address and the telephone number of the device 22 so as to automatically translate the telephone number into its corresponding IP address. It is working as following the client end 21 goes online first, and input the telephone number of the device 22 on the location of URL (Uniform Resource Locator) of its browser. Then, the translating tool 231 in ISP 23a translates the telephone number into its corresponding IP address so that the client end 21 is able to access the personal web page 1 from the present invention's device 22. However, if the present invention's device 22 doesn't dial its ISP 23b to get online, the client end 21 can not find the web page 1.

No matter in practice or operation, the communicating method basing on the first embodiment is more complicated then the first one. But it has an advantage of just paying the expense of network. It transmits messages only through network, so it is needless to pay expense of telephone system capable of saving plenty of long-distance telephone due.

Whatever the first embodiment or the second embodiment described above, the present invention's device must have a built-in modem so as to get online and send web page. However, except the client end 21 is a cellular phone, but is able to be chosen as a PDA (Personal Digital Assistant), a notebook, a PC (Personal Computer) or a HPC (Hand-held PC). As long as they have an online function, they all can perform the method of the present invention.

Figure 4:
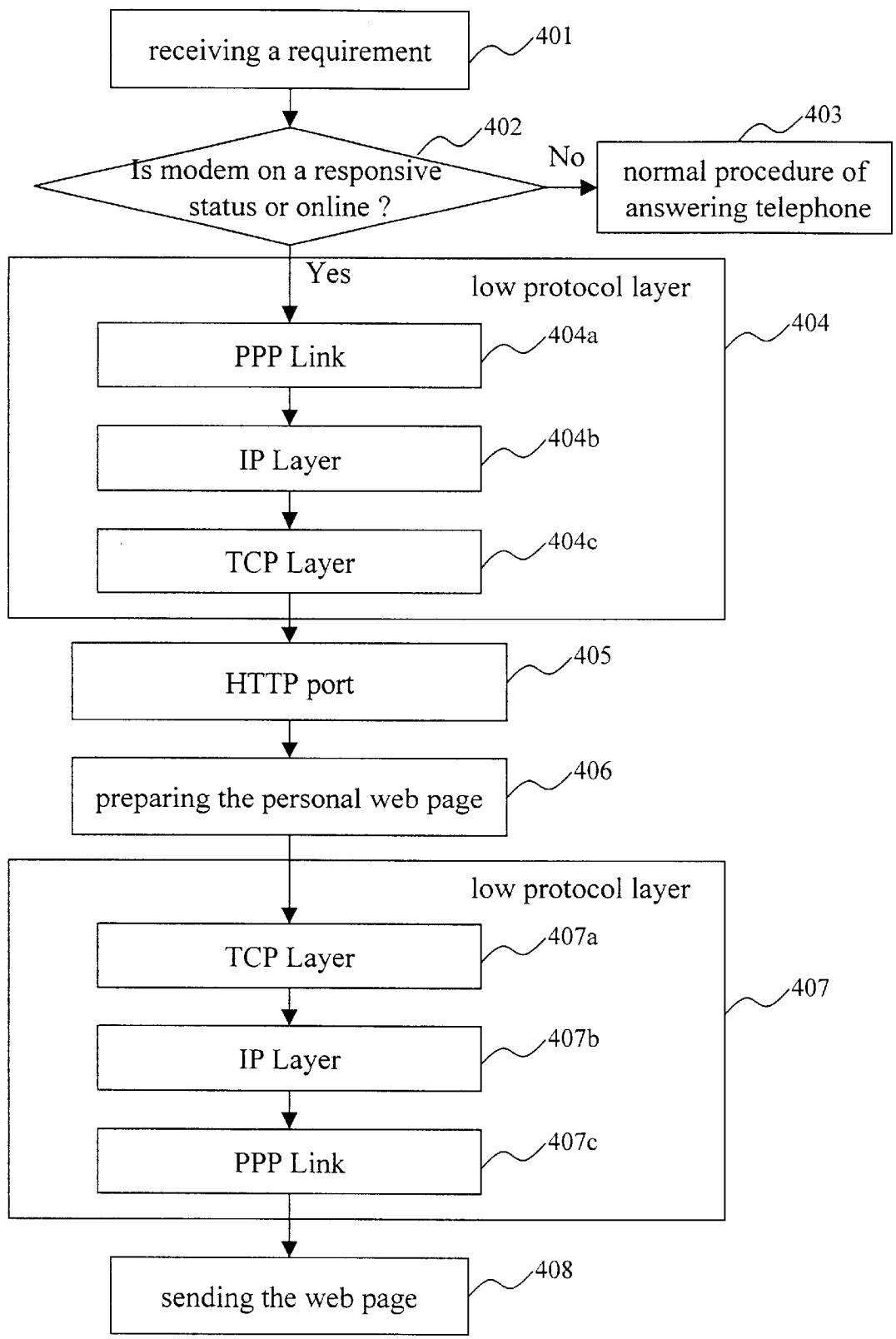
FIG. 4 is a schematic view showing the software structure and basic flow path of the present invention.

Referring to FIG. 4, which is a flowchart of sending web page by the present invention's device. When the present invention's device receives a requirement from the client end (step 401), first, checking whether the modem is set on a responsive status or has dialed ISP to get online (step 402). If there is none of them, the present invention's device keeps proceeding the normal procedure of answering telephone (step 403), like ringing for being aware of the phone's owner. If there is any one of them, the procedure goes into a low protocol layer for analyzing (step 404). Wherein it is necessary to pass through PPP Link (Point-to-Point Protocol Link) (step 404a), IP Layer (Internet Protocol Layer) (step 404b) and TCP Layer (Transmission Control Protocol Layer)(step 404c). The three protocols mentioned above are standard protocols of online browsing. Their implements of software are so easy to be achieved by people skilled in the art to put other detailed description here. After the analyzing of the three protocols, the procedure goes into HTTP (Hyper Text Transmission Protocol) layer (step 405) so as to let its socket port ready for sending the web page. Then the procedure goes into preparing the personal web page ready (step 406). It is a function of an application layer. Before sending the personal web page, let it pass through the analyzing of the low protocol layer (step 407). With the same way, it is necessary to pass through TCP Layer (Transmission Control Protocol Layer) (step 407a), IP Layer (Internet Protocol Layer) (step 407b) and PPP Link (Point-to-Point Protocol Link) (step 407c). The contents of above three protocols (step 407) are the same with previous threes (step 404) but their orders of execution are opposite. Because the previous low protocol layer (step 404) is doing for receiving signals, the present one is doing for sending messages. Similarly, the implements of software are so easy to be achieved by people skilled in the art to put other detailed description here. Finally, the present invention executes the step of sending the personal web page to the client end (step 408).

Figure 5:
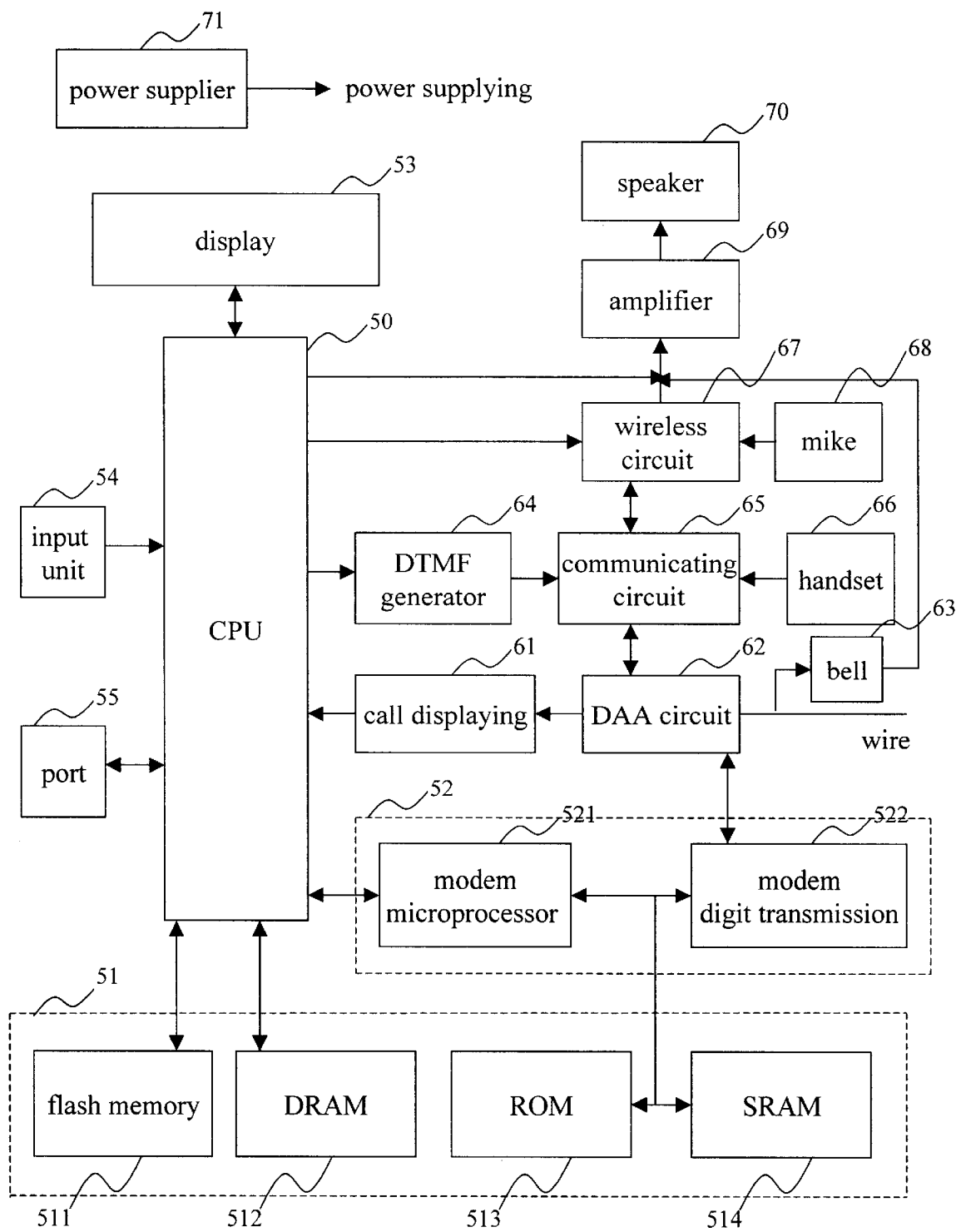
FIG. 5 is a schematic view showing the hardware structure of the present invention.

The hardware structure of the present invention is shown as FIG. 5, which comprises: a input unit 54, a port 55, a CPU (central processing unit) 50, a display 53, a modem 52 and memories 51. The input unit 54 is a kind of device, like a button, a keyboard or a touch panel, capable of inputting signals by its owner. So the phone's owner is able to set the modem on a responsive status, get online or write down messages in the personal web page through the input unit 54. A LCD (Liquid Crystal Display) is chosen to be the display 53 which is an interface of showing the personal web page. The CPU 50 plays a control role including controlling the processes while software is running and being a center of coordinating the memories 51, the modem 52, the port 55 and the input unit 54. The memories 51 further comprise a flash memory 511, a DRAM (Dynamic Random-Access Memory) 512, a ROM (Read-Only Memory) 513 and a SRAM (Static RAM) 514. The flash memory 511 and the DRAM 512 are the space of storing data and statistics when the CPU 50 works. The ROM 513 and the SRAM 514 are used to store the personal web page, the messages written by the phone's owner and other related data. Of course, the built-in modem 52 is necessary for transmitting the personal web page to network, wherein further divided into two parts of a microprocessor 521 and a digit transmission part 522. The microprocessor 521 is responsible for coping with the signals transmitted from the CPU 50, and accesses the data stored in the ROM 513 and the SRAM 514, and then pass to the digit transmission part 522 to send out. Otherwise, the present invention's device further comprises a port 55 to be the interface of receiving telephone signals.

Due to the present invention is applied in a cellular phone, except the hardware described above, the present invention's device further needs some essential components of a general cellular phone, such like a DTMF (Dual-Tone Multifrequency) generator 64, a call displaying device 61, a DAA (Data Access Arrangement) circuit 62, a communicating circuit 65, a wireless circuit 67, a mike 68, a handset 66, a bell 63, a amplifier 69, a speaker 70 and a power supplier 71 and so on. Similarly, the implements of the hardware described above are easy to be achieved by people skilled in the art to put other detailed description here.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of communication through web page, the method comprising the steps of:

providing a cellular phone with a telephone number and a personal web page;

setting a modem of the cellular phone on a responsive status or an online status;

if the modem is set on the responsive status, then inputting and dialing the telephone number of the cellular phone by a client end, which has an online function, transmitting a signal out by the client end;

passing the web page to the client end through internet after receiving the signal by the cellular phone;

if the modem is set on the online status, then providing the IP address of the personal web page by the cellular phone after it going online;

providing a translating tool having the telephone number and the IP address of the cellular phone;

inputting the telephone number of the cellular phone on a browser online by a client end; and using the translating tool to translate the telephone number of the cellular phone into the IP address so that the client end is able to go into and browse the personal web page.

2. The method according to claim 1, wherein the cellular phone has a built-in modem to be the interface between the cellular phone and Internet.

3. The method according to claim 2, wherein the built-in modem is set on a responsive status to automatically response the signal and pass the personal web page.

4. The method according to claim 1, wherein the client end is selected from the group comprising a cellular phone, a personal digital assistant (PDA), a personal computer (PC), a notebook, a laptop and a hand-hold PC.

5. The method according to claim 1, wherein the client end is through a modem or a network interface card (NIC) to get online.

6. The method according to claim 1, wherein the personal web page is a web page showing pure text.

7. The method according to claim 1, wherein the cellular phone is through TCP/IP and HTTP protocols to pass on the personal web page to the client end.

8. The method according to claim 1, wherein the client end is through TCP/IP and HTTP protocols to get the personal web page from Internet.

9. The method according to claim 1, wherein it is through a translative tool in ISP to translate the telephone number of the cellular phone into its corresponding the IP address.

10. The method according to claim 9, wherein the translative tool stores the relationship between the IP address of the personal web page and telephone number of the cellular phone.

11. A device of communication through web page which is applied in a cellular phone and the cellular phone has a personal web page, the device comprising:

a memory, which stores at least the personal web page;

a modem having a responsive status and an online status, the modem lets the cellular phone get online through wireless communication and sends the personal web page in the memory;

an input unit, which is an interface that the phone's owner is able to input a signal into the cellular phone to let the modem be set on responsive status;

a central processing unit, which is a control center of the memory, the modem and the input unit; and a port, which is an interface of receiving a signal of the cellular phone and then transmits the signal to the central processing unit.

12. The device according to claim 11 further comprises a display, which is an interface to show the personal web page.

13. The device according to claim 12, wherein the display is a liquid crystal display (LCD).

14. The device according to claim 11, wherein the input unit is selected from the group comprising a button, a keyboard and a touch panel.

15. The device according to claim 11, wherein the input unit further provides the function of writing messages to the personal web page by the phone's owner.

16. The device according to claim 11, wherein the modem is through TCP/IP and HTTP protocols to pass on the personal web page to Internet.

* * * * *